(12) United States Patent  (10) Patent No.: US 7,151,949 B2
Cavill et al.  (45) Date of Patent: Dec. 19, 2006

(54) WIRELESS FACSIMILE ADAPTER AND SYSTEM FOR PRINTER AND ALL-IN-ONE DEVICES AND METHODS USING THE SAME

(75) Inventors: Barry R. Cavill, Lexington, KY (US); James L. Combs, Lexington, KY (US); Francis Foldes, Jr., Lexington, KY (US); William H. Reed, Lexington, KY (US); John D. Zbrozek, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 328 days.

(21) Appl. No.: 10/615,756

(22) Filed: Jul. 9, 2003

(65) Prior Publication Data

US 2005/0009560 A1  Jan. 13, 2005

(51) Int. Cl.
 *H04M 1/00* (2006.01)
 *H04M 11/00* (2006.01)
 *H04N 1/32* (2006.01)

(52) U.S. Cl. .............. 455/556.1; 379/93.01; 379/100.12; 358/442; 358/468

(58) Field of Classification Search ............. 455/556.1; 358/468, 442; 379/93.01, 100.12
See application file for complete search history.

(56) References Cited

U.S. PATENT DOCUMENTS

| 4,809,297 A | 2/1989 | Polansky et al. |
| 4,881,129 A | 11/1989 | Mitsuhashi |
| 4,922,546 A | 5/1990 | Takahashi et al. |
| 4,933,770 A | 6/1990 | DeSpain |
| 4,956,876 A | 9/1990 | Koshiishi |
| 4,977,609 A | 12/1990 | McClure |
| 4,991,201 A * | 2/1991 | Tseng ................... 379/100.12 |
| 5,041,918 A * | 8/1991 | Ishida et al. ................ 358/442 |
| 5,237,429 A | 8/1993 | Zuiss et al. |
| 5,247,566 A | 9/1993 | Hiramatsu |
| 5,247,575 A | 9/1993 | Sprague et al. |
| 5,263,078 A | 11/1993 | Takahashi et al. |
| 5,282,238 A | 1/1994 | Berland |
| 5,299,024 A | 3/1994 | Kafri |
| 5,335,276 A | 8/1994 | Thompson et al. |
| 5,416,828 A | 5/1995 | Hiramatsu et al. |
| 5,426,511 A | 6/1995 | Nagatomo |
| 5,450,472 A | 9/1995 | Brax |
| 5,463,477 A | 10/1995 | Kakizaki |

(Continued)

FOREIGN PATENT DOCUMENTS

JP  3-42957  *  2/1991

OTHER PUBLICATIONS

TELULAR, "Phonecell SX5E," Fixed Wireless Terminal, p. 1-2, (2002).

(Continued)

*Primary Examiner*—William D. Cumming
(74) *Attorney, Agent, or Firm*—Geoffrey L. Oberhaus (57) ABSTRACT

An apparatus for connecting a printer to a cellular radio system. The adapter allows the printer to conduct facsimile operations. The adapter has a facsimile module which includes executable instructions for decoding fax data and processing the fax data to generate print data for printing; a cell radio; one or more communication ports having at least one of the communication ports in communication with the printer; and a data encoder in communication with the facsimile module and the cell radio. The data encoder is configured to convert data transmitted between the facsimile module and the cell radio.

18 Claims, 5 Drawing Sheets

U.S. PATENT DOCUMENTS

| | | |
|---|---|---|
| 5,479,475 A | 12/1995 | Grob et al. |
| 5,479,479 A | 12/1995 | Braitberg et al. |
| 5,487,175 A | 1/1996 | Bayley et al. |
| 5,509,050 A | 4/1996 | Berland |
| 5,574,773 A | 11/1996 | Grob et al. |
| 5,590,406 A | 12/1996 | Bayley et al. |
| 5,608,545 A | 3/1997 | Kagawa |
| 5,752,199 A | 5/1998 | Scott |
| 5,771,467 A | 6/1998 | Sato |
| 5,790,268 A | 8/1998 | Chomet |
| 5,802,471 A | 9/1998 | Sawai et al. |
| 5,864,763 A | 1/1999 | Leung et al. |
| 5,870,679 A | 2/1999 | Ezumi |
| 5,883,723 A | 3/1999 | Sakata |
| 5,915,002 A | 6/1999 | Shimosako |
| 5,920,402 A | 7/1999 | Scott |
| 5,920,825 A | 7/1999 | Patel et al. |
| 5,953,647 A | 9/1999 | Patel et al. |
| 5,966,669 A | 10/1999 | Kenmochi et al. |
| 6,011,634 A * | 1/2000 | Aihara et al. ............... 358/468 |
| 6,011,968 A | 1/2000 | Patel et al. |
| 6,035,205 A | 3/2000 | Han |
| 6,057,943 A | 5/2000 | Kweon et al. |
| 6,075,792 A | 6/2000 | Ozluturk |
| 6,115,142 A | 9/2000 | Leung |
| 6,124,949 A | 9/2000 | West et al. |
| 6,144,464 A | 11/2000 | Rupp et al. |
| 6,147,978 A | 11/2000 | John et al. |
| 6,157,846 A | 12/2000 | Manning et al. |
| 6,161,007 A | 12/2000 | McCutcheon et al. |
| 6,181,954 B1 | 1/2001 | Monroe et al. |
| 6,281,988 B1 | 8/2001 | Leung |
| 6,349,135 B1 * | 2/2002 | Frazier et al. ........... 379/93.01 |
| 6,400,957 B1 | 6/2002 | Rodrigues et al. |
| 6,434,125 B1 | 8/2002 | Marks et al. |
| 6,459,907 B1 | 10/2002 | Feli |
| 2001/0012339 A1 | 8/2001 | Frazier et al. |
| 2001/0019964 A1 | 9/2001 | Shimizu |
| 2002/0164953 A1 | 11/2002 | Curtis |
| 2002/0169002 A1 | 11/2002 | Imbrie et al. |
| 2003/0002073 A1 | 1/2003 | Berkema et al. |
| 2003/0003957 A1 | 1/2003 | Berkema et al. |
| 2003/0007176 A1 | 1/2003 | Takamine |
| 2003/0038963 A1 | 2/2003 | Yamaguchi |
| 2003/0045236 A1 | 3/2003 | Chang et al. |
| 2003/0054766 A1 | 3/2003 | Clough et al. |
| 2003/0054859 A1 | 3/2003 | Goto |
| 2005/0009560 A1 * | 1/2005 | Cavill et al. ............. 455/556.1 |

OTHER PUBLICATIONS

TELULAR, "Phonecell SX4E—for GSM 900 or GSM 1800," p. 1-2, (2001).

* cited by examiner

WIRELESS FACSIMILE ADAPTER AND SYSTEM FOR PRINTER AND ALL-IN-ONE DEVICES AND METHODS USING THE SAME

FIELD OF THE INVENTION

Embodiments of the present invention relate generally to wireless printer adapters, and most specifically, to methods and apparatus for providing facsimile functionality over a wireless connection to a printer, all-in-one device or other peripheral device.

BACKGROUND OF THE INVENTION

Facsimile is a well-established and standard method for communication of hard copy information. The more common data link for facsimile uses traditional phone wires, and most facsimile machines can be attached directly to the telephone network. In many countries around the world, installation of permanent phone lines is slow and expensive and wireless mobile telephone infrastructure has substantially replaced traditional phone service. Data rates on wireless lines have been lower than rates on traditional telephone lines but new, third-generation (3G) wireless technologies are being deployed that deliver higher data rates than either traditional telephone wire or basic digital wireless telephone systems. Perhaps because they have more competition, wireless telephone service providers often offer different pricing models than traditional phone service providers—pricing that may include free or reduced rate long-distance calls. Such free or reduced rate long-distance calls would be attractive for consumers and businesses that send/receive a large number of facsimiles. Although adapters (for example, the Phonecell® SX5e Fixed Wireless Terminal from Telular Corporation) are available in the market that bridge standard facsimile machines to wireless networks, they are costly and not widely available. In addition, there is no simple means to connect a printer or all-in-one device lacking facsimile functionality to operate on a wireless telephone network and provide built-in facsimile operations.

All-in-one devices (also called multi-function devices or MFDs) integrate scanning and copying functionality into a printer and may or may not include standalone facsimile functionality. Most of the lower cost all-in-one devices are host-based as they require attachment to a host computer that provides processing and control for copying and facsimile functions. It is desired to have a wireless adapter that incorporates facsimile functionality to enable supported all-in-one devices and printers to serve as facsimile machines on wireless telephone networks.

SUMMARY OF THE INVENTION

An adapter for connecting a printer or all-in-one device to a cellular radio system, wherein the adapter allows the printer or all-in-one device to conduct facsimile operations.

One embodiment of the present invention is an adapter for connecting a printer to a cellular radio system, wherein the adapter allows the printer to conduct facsimile operations. The adapter comprises: a facsimile module, wherein the facsimile modules includes executable instructions for decoding fax data and processing the fax data to generate print data for printing; a cell radio; one or more communication ports, wherein at least one of the communication ports is in communication with the printer; and a data encoder in communication with the facsimile module and the cell radio, wherein the data encoder is configured to convert data transmitted between the facsimile module and the cell radio.

Another embodiment of the present invention comprises an adapter for connecting a printer and a scanner to a cellular radio system, wherein the adapter enables the printer and the scanner to conduct facsimile operations. The adapter comprises: a facsimile module, wherein the facsimile modules includes executable instructions for encoding data received from the scanner and decoding fax data and processing the fax data to generate print data for printing; a cell radio; a peripheral controller, wherein the peripheral controller includes executable instructions to control the printer and/or the scanner; one or more communication ports, wherein at least one of the communication ports is in communication with the printer and at least one of the communication ports is in communication with the scanner; and a data encoder in communication with the facsimile module and the cell radio, wherein the data encoder is configured to convert data transmitted between the facsimile module and the cell radio.

Yet another embodiment of the present invention is an adapter for connecting an all-in-one device or multi-function device (MFD) to a cellular radio system, wherein the adapter allows the all-in-one device to conduct facsimile operations. The adapter comprises: a facsimile module, wherein the facsimile module includes executable instructions for encoding data received from the all-in-one device and decoding fax data and processing the fax data to generate print data for printing; a cell radio; a peripheral controller, wherein the peripheral controller includes executable instructions to control the all-in-one device; one or more communication ports, wherein at least one of the communication ports is in communication with the all-in-one device; and a data encoder in communication with the facsimile module and the cell radio, wherein the data encoder is configured to convert data transmitted between the facsimile module and the cell radio.

Another embodiment of the present invention is a system for performing facsimile operations on a printer over a cellular radio system, wherein the printer lacks facsimile receiving functionality. The system comprises: a printer; an adapter for connecting the printer to a cellular radio system; and a communication link between the printer and the adapter. The adapter comprises: a facsimile module having executable instructions for decoding fax data and processing the fax data to generate data for printing; a cell radio; one or more communication ports, wherein at least one of the communication ports is in communication with the printer; and a data encoder in communication with the facsimile module and the cell radio, wherein the data encoder is configured to convert data transmitted between the facsimile module and the cell radio.

Yet another embodiment of the present invention is a method for receiving, through a cellular network system, a facsimile on a printer, wherein the printer lacks facsimile receiving functionality. The method comprises: receiving facsimile data in a first format from a cellular network system; decoding the received facsimile data into a second format; generating print data corresponding to the received facsimile data in the second format; and transmitting the print data to a printer to record an image corresponding to the print data.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

The embodiments set forth in the drawings are illustrative in nature and are not intended to be limiting of the invention defined by the claims. Moreover, individual features of the drawings and the invention will be more fully apparent and understood in view of the detailed description.

DETAILED DESCRIPTION

Reference will now be made in detail to various embodiments of the invention, examples of which are illustrated in the accompanying drawings, wherein like numerals indicate similar elements throughout the views.

Figure 1:
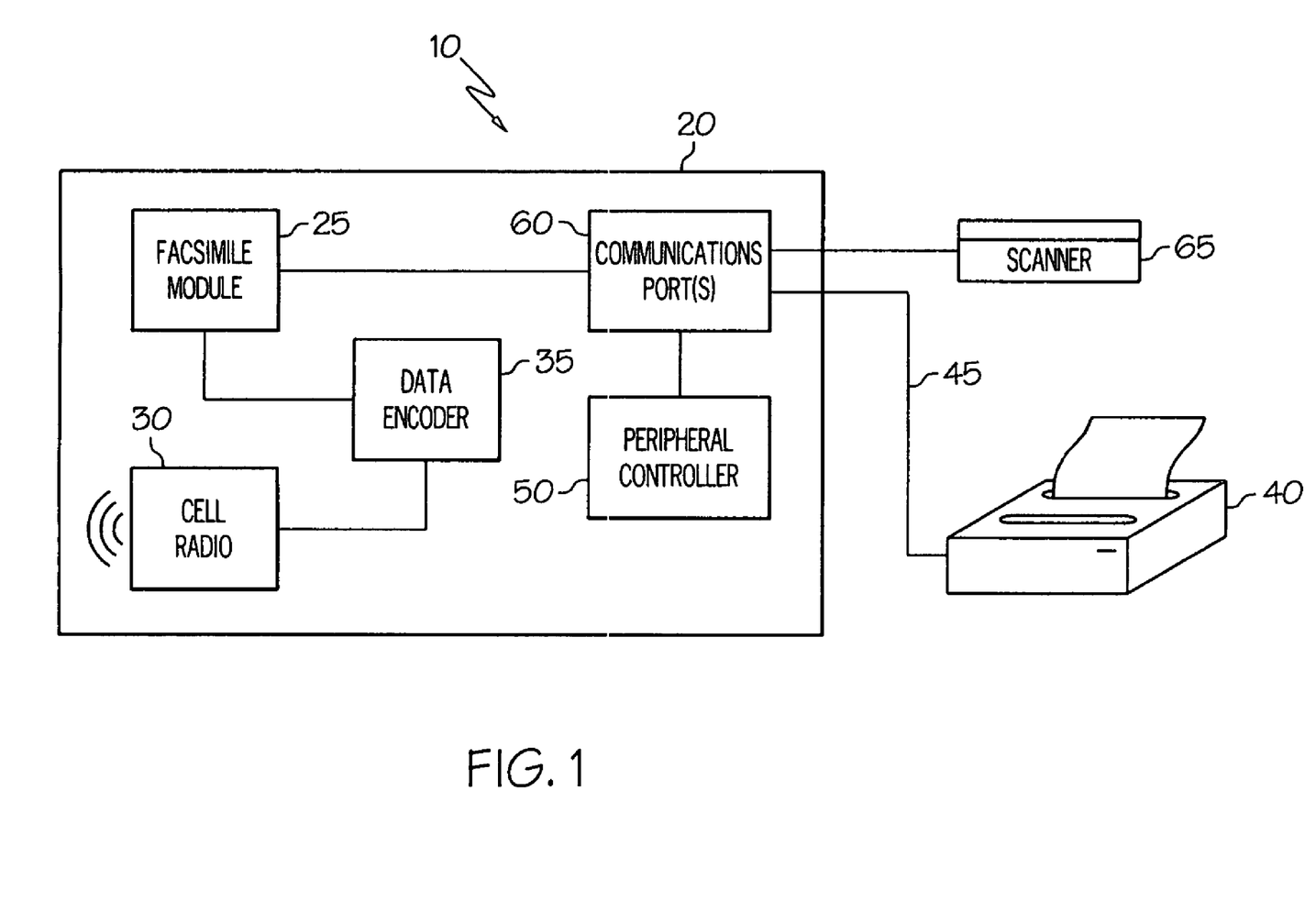
FIG. 1 is a schematic illustration of an exemplary adapter for practicing one embodiment of the present invention.

One embodiment of the present invention is depicted in FIG. 1. FIG. 1 illustrates an exemplary system 10 for conducting facsimile operations on a printer 40. The system 10 comprises an adapter 20 for connecting a printer 40 to a cellular radio system, wherein the adapter 20 enables the printer 40 to conduct facsimile operations. The adapter 20 comprises: a facsimile module 25, wherein the facsimile module 25 includes executable instructions for decoding fax data and processing the fax data to generate print data for printing; a cell radio 30; one or more communication ports 60, wherein at least one of the communication ports 60 is in communication with the printer 40 through communication link 45; and a data encoder 35 in communication with the facsimile module 25 and the cell radio 30, wherein the data encoder 35 is configured to convert data transmitted between the facsimile module 25 and the cell radio 30.

In one embodiment, the printer 40 may be a stand-alone printer. A stand-alone printer is a printer which does not need an external device such as a computer to process and print an image or document. The stand-alone printer may be capable of additionally receiving print jobs from an attached computer or other peripheral device, but such attachment is not required in processing of the data to be printed and the data can be processed on the stand-alone printer. In one embodiment, the printer 40 is a host-based printer, and the adapter 20 comprises a peripheral controller 50. The peripheral controller 50 includes executable instructions to control the printer 40.

Figure 4:
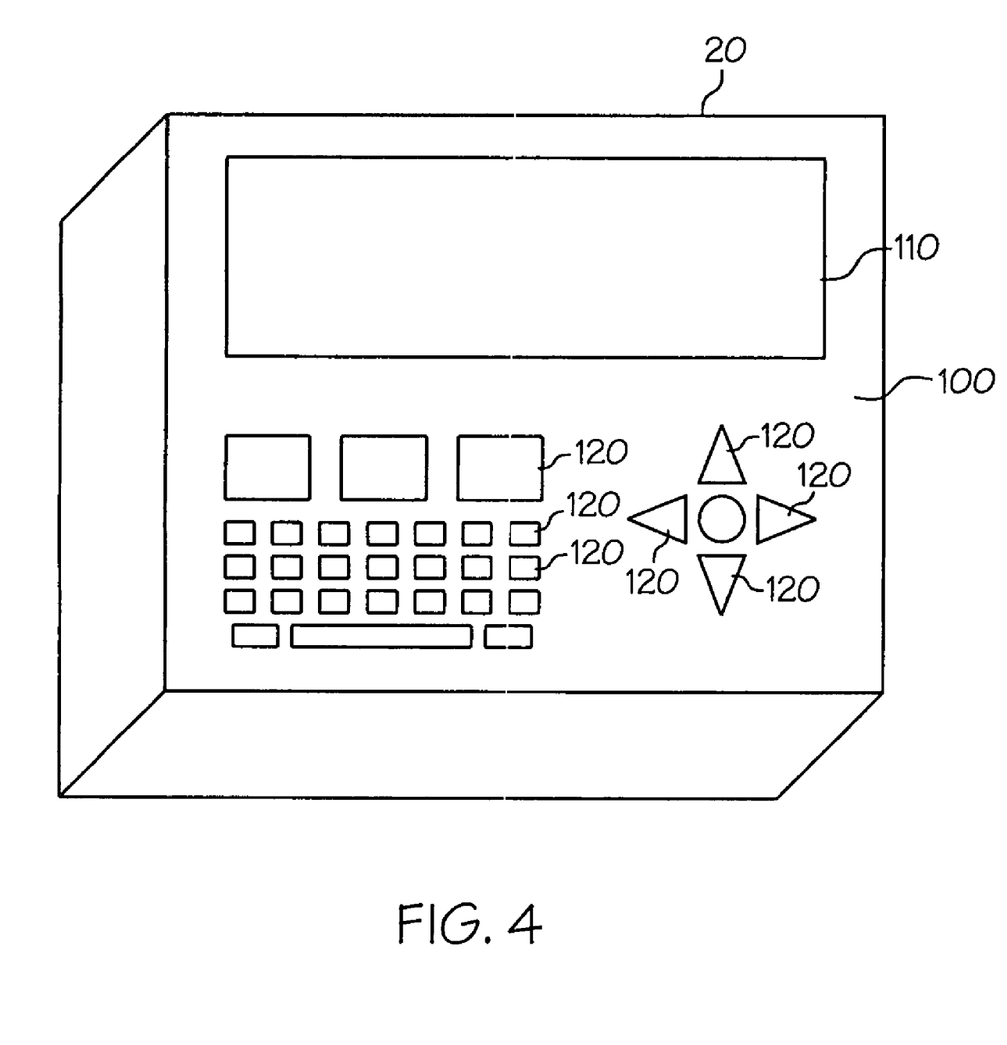
FIG. 4 is a schematic illustration of an exemplary user interface of adapter of the present invention.

In another embodiment, a scanner 55 may be attached to one of the communication ports 60 of the adapter 20 to provide facsimile sending capabilities to a scanner 55. The peripheral controller 50 may include executable instructions for controlling the scanner 55 and to enable a facsimile to be sent utilizing the adapter 20. For example, a document may be placed on the platen of the scanner which is connected to a communication port of the adapter. Exemplary communication ports and communication links include an universal serial bus (USB) cable connection, an IEEE1394 "fire wire" connection or any other connection means known to one skilled in the art (such as IR, RF, BLUETOOTH, LASER LINK, etc.) In one exemplary embodiment, a user can send a fax from a scanner using the scanner user interface. The scanner 55 performs a scanning operation and transmits the scanned data through the communication port 60 to the facsimile module 25. The facsimile module 25 converts the scanned image data into the appropriate format for sending a facsimile and adds appropriate facsimile header information. This data is then transmitted to the data encoder 35, wherein the data is encoded to be sent over a cellular network and then the data is transferred to the cell radio 30 to be sent over the cellular network system. As one skilled in the art will appreciate, by connecting a scanner 55 and a printer 40 through communication link 45 to the adapter 20 through the communication ports 60, the exemplary adapter 20 provides the functionality of a conventional fax machine but also allows the transmission and receipt of facsimile documents over a cellular radio network. In another embodiment, as depicted in FIG. 4, the adapter 20 comprises a user interface 100 to interact with the user for facsimile operations. The user interface includes a visual display 110 and a plurality of input keys 120. Exemplary input keys 120 may comprise a keyboard, number pad, and/or directional keypads.

Figure 2:
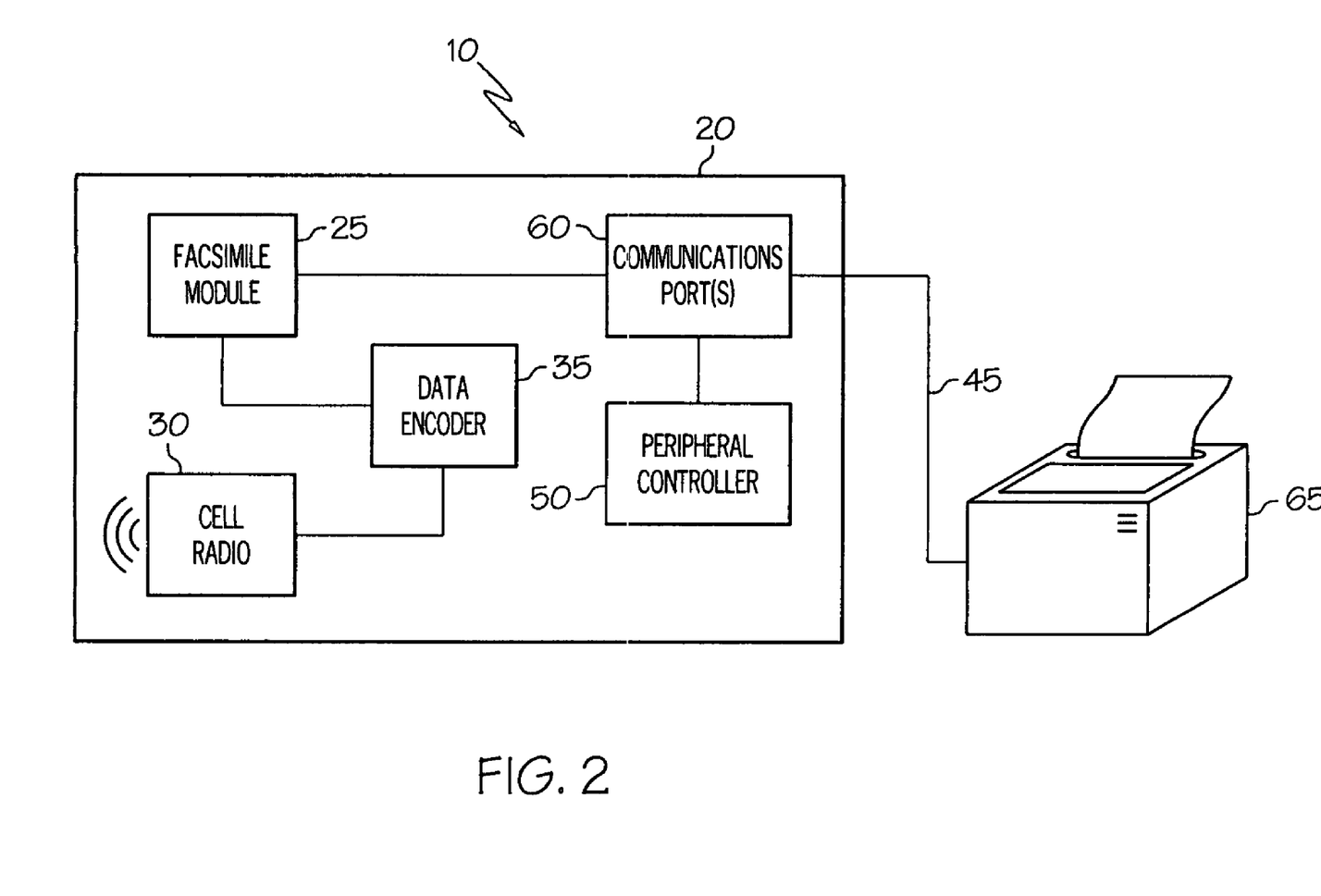
FIG. 2 is a schematic illustration of an exemplary adapter for practicing another embodiment of the present invention.

Another exemplary embodiment of the present invention is illustrated in FIG. 2. In this embodiment, the adapter 20 is configured to connect an all-in-one device, (or multifunctional device (MFD)) to a cellular radio system, wherein the adapter enables the all-in-one device to conduct facsimile operations. The adapter comprises: a facsimile module 25, wherein a facsimile module includes executable instructions for encoding data received from the all-in-one device 65 and decoding fax data and processing the fax data to generate print data for printing; a cell radio 30; one or more communication ports 60, wherein at least one of the communication ports 60 is in communication with the all-in-one device 65 through communication link 45; and a data encoder 35 in communication with the facsimile module 25 and the cell radio 30, wherein the data encoder 35 is configured to convert data transmitted between the facsimile module 25 and the cell radio 30. In one embodiment, the adapter 20 further comprises a peripheral controller 50, wherein the peripheral controller 50 includes executable instructions to control an all-in-one device 65 that does not comprise stand-alone capabilities.

Figure 3:
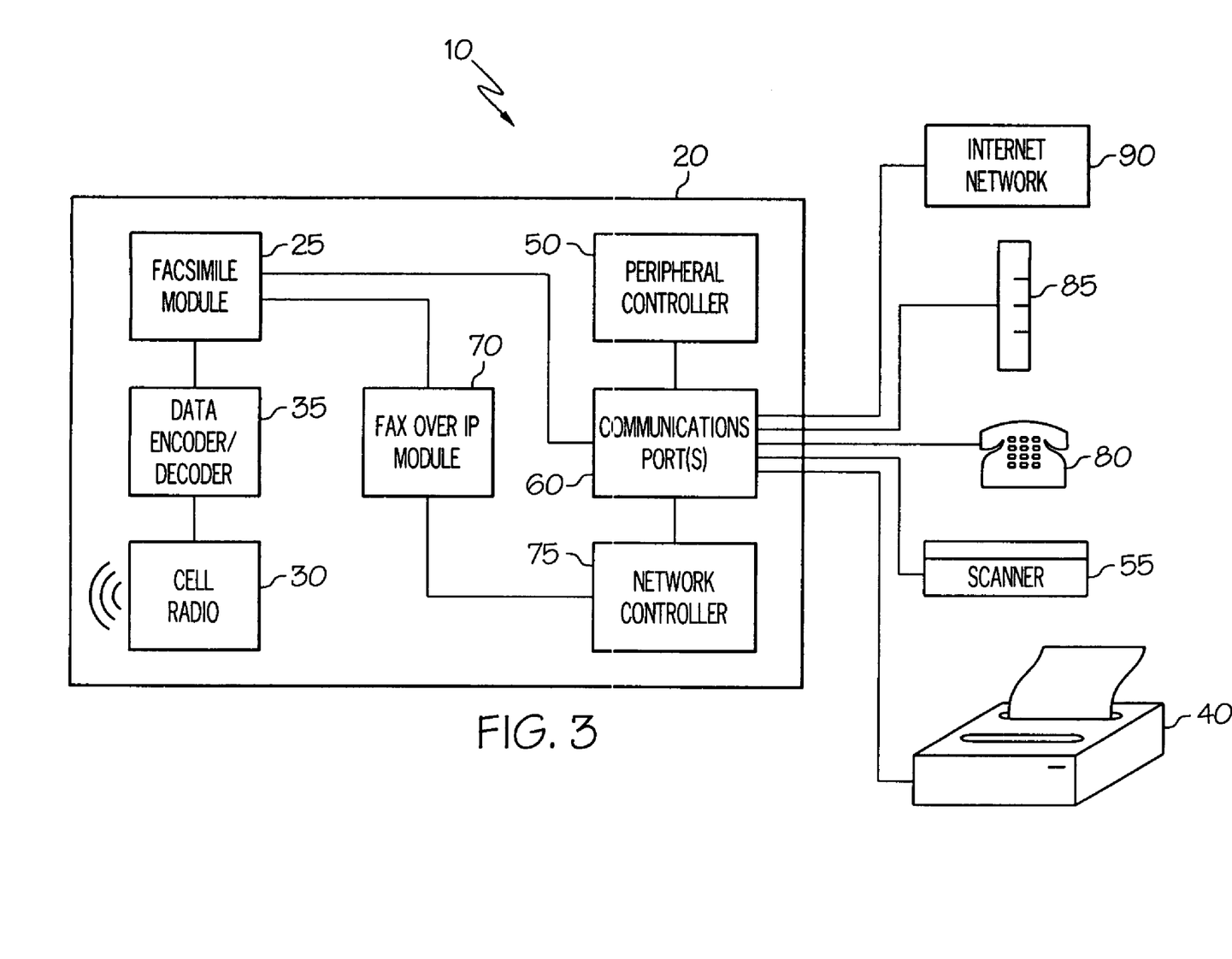
FIG. 3 is a schematic illustration of an exemplary adapter of the present invention.

Another embodiment of the present invention is illustrated in FIG. 3. The adapter 20 may comprise in addition to the facsimile module 25, data encoder 35, cell radio 30 and communication port(s) 60 described above, additional components such as a fax over IP module 70 and a network controller 75.

The fax over IP module 70 enables the adapter to send and receive facsimile information over Internet protocol (IP) type networks such as the Internet. This process is similar to email and to voice over IP (VoIP), wherein telephone voice calls are sent over the Internet. The Internet IP address replaces the telephone number and the network connection replaces the telephone cable. One obvious benefit is that there is no long distance charges for fax documents on the Internet. Typically, real time network faxing required a specialized analog/digital access devices, capable of "spoofing" 2 T-30-based, dial-up fax machines into connecting over a QoS(quality of service)-variable data connection. Ratification of transmission standards T-37 and T-38 enable facsimile communication to take place over a network. The T-37 method comprises: scanning a document, producing a binary image in a standard format (.tiff), compressing it using a standardized compression algorithm and sending the file to any email address as an email attachment (the body of the email is used as the cover sheet) using SMTP data formats and underlying protocols (including FTP). The recipient, using a standard email client or another Internet fax machine, connects to an inbound mail server, and downloads the email with attachment. The email client or additional software decompresses the attachment and displays or prints the corresponding material from the attachment. The T-37 standard comprises a fast robust process because it allows the sending fax machine to finish its transmission without waiting for the receiving fax machine to become available (i.e., no busy signal—no paper out failures, etc.). The T-37 standard also preserves image quality as the attached file data is transmitted in a lossless and error-free format. Lost packets during transmission or reception are identified using error correction codes and corrected mathematically or by packet retry and other methods known to one skilled in the art. If submission to or from the email server is interrupted by the network, (such as mail server failure) the data is still safely maintained (either on the transmitting machine or in a spool folder associated with the receiving machine's email account) until normal conditions resume. When normal conditions resume, the failed transmissions resume transparently. A T-37 compatible Internet fax machine can transmit and receive from any email client (standard or web-based) capable of handling standard compression algorithms.

The T-38 standard defines real time fax over IP. Real time fax over IP works like a regular fax call. The two fax machines establish a connection and then sync up and send data over a local telephone connection with an IP leg between the two local connections. If the fax is busy, the caller gets a busy signal and the user has the option to retry sending the fax later or revert to a storage and forward mode (T-37 standard) as the transportation mechanism. In one embodiment of the present invention, when two devices having the wireless adapter connect to send a fax over IP, there may be no local connection and the entire transmission will be under the T-38 standard.

Another embodiment of the present invention is a method for receiving, through a cellular network system, a facsimile on a printer in which the printer lacks facsimile receiving functionality. The method comprises receiving a facsimile data signal in a first format from a cellular network system; decoding the received facsimile data into a second format; generating print data corresponding to the received facsimile data in the second format; and transmitting the print data to a printer to record an image of the print data.

In one embodiment of the present invention, when two similar wireless fax adapters are communicating, the adapters may negotiate faster, non-standard communication modes that take advantage of the high speed data rates allowed on newer wireless telephone networks, such as third-generation wireless technologies (3G) including but not limited to GPRS, EDGE, W-CDMA.

One weakness of wireless facsimile can be the potential loss of confidentiality since wireless communication is subject to detection. To address this concern, in one embodiment of the present invention, the adapter would provide advanced encryption of the facsimile data when transmitting wirelessly. The encryption would be proprietary and only available when communicating between two units following the same encryption protocol. Whereas in another embodiment, the wireless fax adapter may utilize a known encryption technology such as PGP (pretty good privacy) or other encryption technology known to one skilled in the art.

In yet another embodiment, the adapter will comprise an internal PBX (private branch exchange) that simulates a phone connection (POTS/PSTN) including dial tone, ring tone, etc. to a fax enabled all-in-one device that may be connected to the RJ-11 connection as part of the communication and encoding process. In another embodiment, the wireless adapter also contains a USB host port to which an all-in-one device that is not stand-alone capable and requires a host to be connected. The adapter comprises the capability to convert incoming fax data to print data for printing and conversion of scanned data to fax information to be transmitted. In a further embodiment, a USB client connection is present to allow connection of a personal computer (PC) 85 (FIG. 3) or other peripheral to the adapter to allow for easy adapter configuration and set-up. In addition, the PC 85 can be used for a fax user interface if the all-in-one device does not have a suitable user interface capable of fax function selection. In addition, if a imaging device is not present, a fax can be initiated from the PC using a PC fax program.

In another embodiment of the present invention, the adapter further comprises local networking of the all-in-one device or printer. If a network connection is provided on the adapter (such as RJ-45 connector) and associated circuitry 75 for an Ethernet network or other network connections for other topologies (802.11 wireless, BLUETOOTH, etc.), then the all-in-one device can be connected to the network 90, and the device can be shared on the network. In one exemplary embodiment, the adapter includes a HPNA (home phone network alliance) connection on a RJ-11 jack to allow networking over a home phone line in a building.

Since the RJ-11 connection is viewed as a standard phone jack connection to external devices, it is also possible to use standard POTS line devices that may be connected to the adapter to access a cellular network. In this manner, multiple telephones 80, fax units or computers 85 can share the same wireless telephone access node. In one embodiment, the adapter routes data to/from the wireless radio to the correct communication unit served by the adapter.

In another embodiment of the present invention, the facsimile module will comprise executable instructions for connecting to a standard POTS line connection if a cell radio connection cannot be established. The user may through a setup configuration of the adapter define a priority connection order for the adapter selecting which connection type to utilize to transmit the facsimile. For example, the adapter may first check to see if an IP network connection is available to send the facsimile by fax over IP. If no network connection is available, the adapter may then check the available of a cellular network system connection. If neither is available, the adapter may check the availability of the POTS line connection and attempt to communicate the facsimile by the first available connection type.

The wireless adapter of the present invention may be in communication with the printer or all-in-one device through any communication technology known to one skilled in the art. Exemplary technologies include USB/USB 2.0, COMPACT FLASH connection, SMART MEDIA connection, Secure Digital connection, PC card connection, PCI connector, IEEE1394 connector, WIFI (IEEE 802.11), and Ethernet connections. In a further embodiment, the adapter may be inserted into a port, socket or drive on the printer or all-in-one device.

Figure 5:
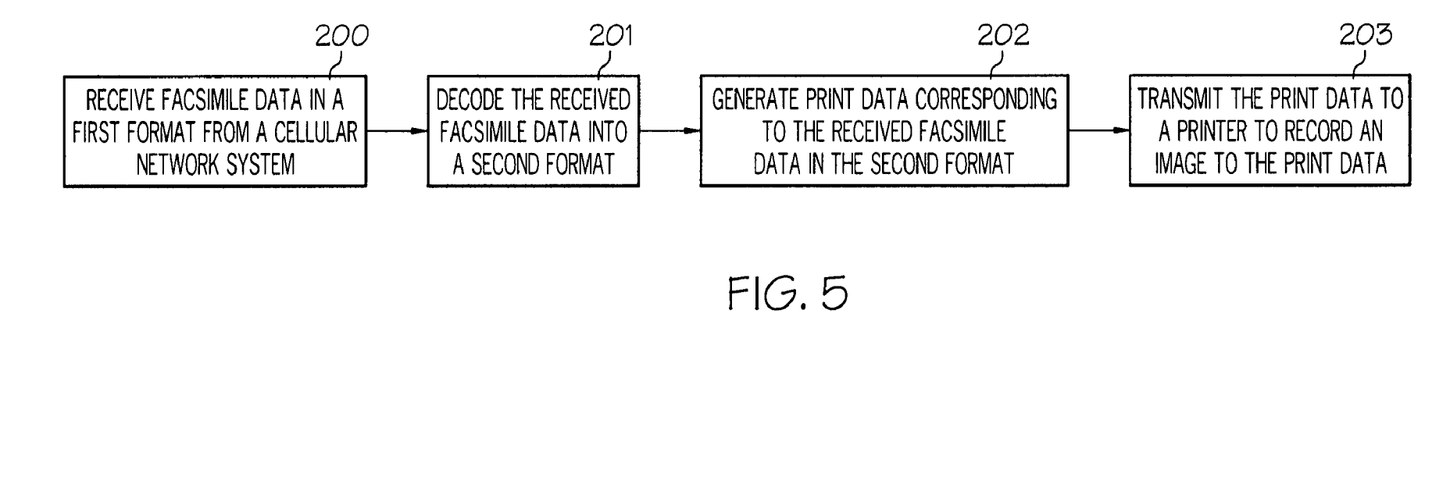
FIG. 5 is a flowchart illustrating an exemplary method of the present invention.

Another embodiment of the present invention is illustrated in FIG. 5. FIG. 5 illustrates a method for receiving, through a cellular network system, a facsimile on a printer in which the printer lacks facsimile receiving functionality. Referring to the drawings, step 200 describes receiving a facsimile data signal in a first format from a cellular network system. In step 201, the received facsimile data is decoded into a second format. Steps 202 and 203 describe generating print data corresponding to the received facsimile data in the second format, and transmitting the print data to a printer to record an image corresponding to the print data, respectively.

The foregoing description of the various embodiments of the invention has been presented for the purposes of illustration and description. It is not intended to be exhaustive or limit the invention to the precise form disclosed. Many alternatives, modifications and variations will be apparent to those skilled in the art of the above teaching. Accordingly, this invention is intended to embrace all alternatives, modifications and variations that have been discussed herein, and others that fall within the spirit and broad scope of the claims.

We claim:

1. An adapter for connecting a printer to a cellular radio system, wherein the adapter enables the printer to conduct facsimile operations, comprising:
   a facsimile module, wherein the facsimile module includes executable instructions for decoding fax data and processing the fax data to generate print data for printing;
   a cell radio;
   a user interface, wherein the user interface is configured to receive instructions from a user;
   one or more communication ports, wherein at least one of the communication ports is in communication with the printer; and
   a data encoder in communication with the facsimile module and the cell radio, wherein the data encoder is configured to convert data transmitted between the facsimile module and the cell radio.

2. The adapter of claim 1, further comprising a peripheral controller, wherein the peripheral controller includes executable instructions to control the printer.

3. The adapter of claim 1, wherein at least one of the communication ports is a universal serial bus.

4. The adapter of claim 1, further comprising a network controller, wherein the network controller comprises executable instructions to establish a network connection through at least one of the communication ports.

5. The adapter of claim 4, further comprising a fax over IP module, wherein the fax over IP module comprises executable instructions for processing fax data through the network connection.

6. The adapter of claim 4, wherein the network connection comprises a wireless network connection.

7. The adapter of claim 1, wherein at least one of the communication ports comprise an RJ-11 connection.

8. The adapter of claim 1, wherein the user interface comprises a video display.

9. The adapter of claim 1, wherein the user interface comprises a plurality of input keys.

10. The adapter of claim 1, wherein the facsimile module further contains executable instructions for determining a priority order on selection of a communication port to utilize for facsimile operations.

11. An adapter for connecting a printer and scanner to a cellular radio system, wherein the adapter enables the printer and scanner to conduct facsimile operations, comprising:
    a facsimile module, wherein the facsimile module includes executable instructions for encoding data received from the scanner and decoding fax data and processing the fax data to generate print data for printing;
    a cell radio;
    a peripheral controller, wherein the peripheral controller includes executable instructions to control the printer and the scanner;
    a user interface, wherein the user interface is configured to receive instructions from a user;
    one or more communication ports, wherein at least one of the communication ports is in communication with the printer and at least one of the communication ports is in communication with the scanner; and
    a data encoder in communication with the facsimile module and the cell radio, wherein the data encoder is configured to convert data transmitted between the facsimile module and the cell radio.

12. An adapter for connecting an all-in-one device to a cellular radio system, wherein the adapter enables the all-in-one device to conduct facsimile operations, comprising:
    a facsimile module, wherein the facsimile module includes executable instructions for encoding data received from the all-in-one device and decoding fax data and processing the fax data to generate print data for printing;
    a cell radio;
    a peripheral controller, wherein the peripheral controller includes executable instructions to control the all-in-one device;
    a user interface, wherein the user interface is configured to receive instructions from a user;
    one or more communication ports, wherein at least one of the communication ports is in communication with the all-in-one device; and
    a data encoder in communication with the facsimile module and the cell radio, wherein the data encoder is configured to convert data transmitted between the facsimile module and the cell radio.

13. A system for performing facsimile operations on a printer over a cellular network, wherein the printer lacks facsimile receiving functionality, the system comprising:
- an adapter for connecting the printer to a cellular radio system;
- a printer; and
- a communication link between the printer and the adapter; wherein the adapter comprises:
  - a facsimile module having executable instructions for decoding fax data and processing the fax data to generate print data for printing;
  - a cell radio;
  - a user interface, wherein the user interface is configured to receive instructions from a user;
  - one or more communication ports, wherein at least one of the communication ports is in communication with the printer; and
  - a data encoder in communication with the facsimile module and the cell radio, wherein the data encoder is configured to convert data transmitted between the facsimile module and the cell radio.

14. The system of claim 13, wherein the communication link comprises a wireless communication link.

15. The adapter of claim 7, further comprising an internal private branch exchange, wherein the internal private branch exchange is configured to provide a phone connection to a facsimile enabled all-in-one device that may be connected to the RJ-11 connection.

16. The adapter of claim 12, wherein at least one of the communication ports comprises an USB port.

17. The adapter of claim 12, wherein at least one of the communication ports is in communication with a local area network.

18. The system of claim 13, wherein the adapter further comprises one or more encryption devices configured to provide encryption of facsimile data transmitted over a cellular network.

* * * * *